Sept. 30, 1941.                E. R. BARRETT                    2,257,365
                        VEHICLE BODY CONSTRUCTION
                          Filed June 12, 1940              2 Sheets-Sheet 1
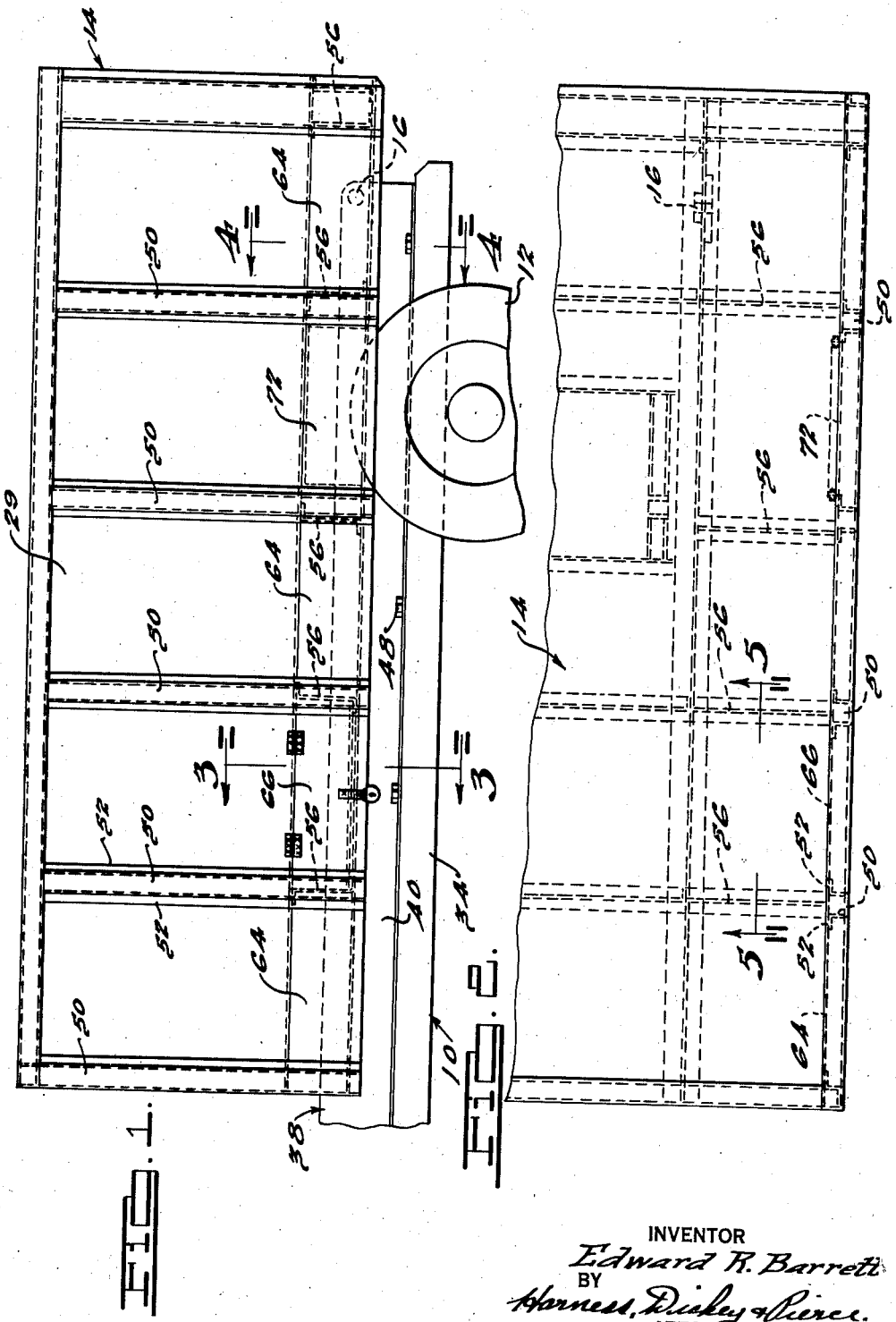
INVENTOR
Edward R. Barrett
BY
Harness, Dickey & Pierce.
ATTORNEYS.

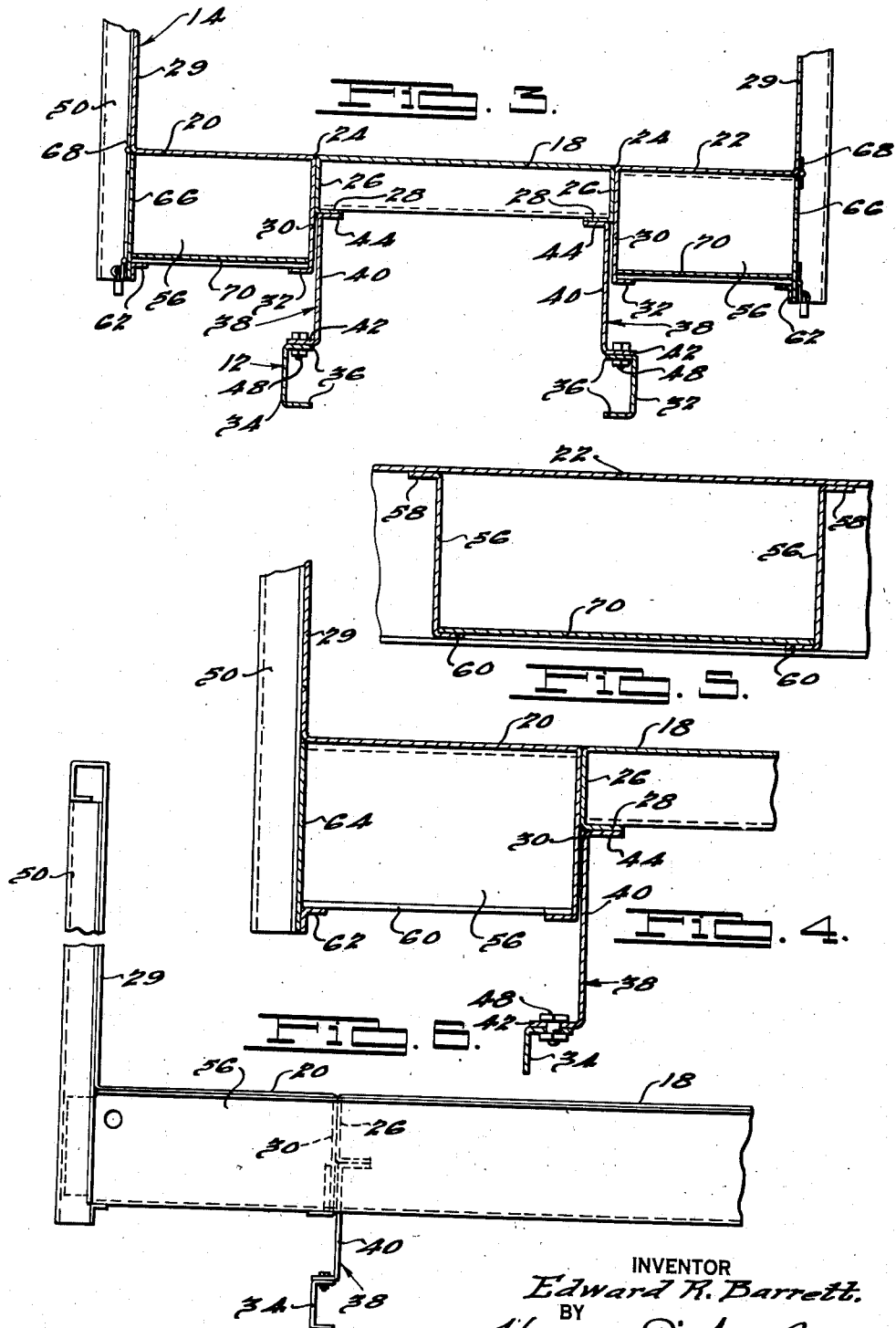

Patented Sept. 30, 1941

2,257,365

UNITED STATES PATENT OFFICE 2,257,365

VEHICLE BODY CONSTRUCTION

Edward R. Barrett, Detroit, Mich., assignor to Gar Wood Industries, Inc., Detroit, Mich., a corporation of Michigan Application June 12, 1940, Serial No. 340,151

8 Claims. (Cl. 296—28)

The present invention relates to vehicle body constructions, and particularly relates to improvements in the type of dump body constructions disclosed and claimed in the copending application of Edward R. Barrett, Serial No. 315,646, filed January 26, 1940.

One of the primary objects of the present invention is to provide an improved construction of the type mentioned in which standard sections are used, such sections being adapted to be used on different size bodies, thereby effecting manufacturing economies.

Another object of the invention is to provide improved constructions of the type mentioned which are attractive in appearance and which have such side surface constructions as to be adapted for the reception of attractive and legible indicia thereon.

A further object of the invention is to provide improved constructions of the type mentioned in which, by the use of standard sections, a variety of functions may be served by certain portions of the body with very little change in the construction and by the use of the aforementioned standard sections.

Another object of the invention is to provide an improved and rugged body construction which may be readily constructed with the use of spot welding methods, thereby effecting economies in manufacture.

Other objects of the invention will become apparent from the following specification, the drawings relating thereto, and from the claims hereinafter set forth.

In the drawings, in which like numerals are used to designate like parts in the several views throughout:

Figure 1 is a fragmentary, side elevational view of a vehicle dump body embodying features of the present invention;

Fig. 2 is a partial plane view of the structure shown in Fig. 1;

Fig. 3 is a cross-sectional view taken substantially along the line 3—3 of Fig. 1;

Fig. 4 is a partial, cross-sectional view taken substantially along the line 4—4 of Fig. 1;

Fig. 5 is a vertical, cross-sectional view taken substantially along the line 5—5 of Fig. 2; and, Fig. 6 is a partial, rear view of the structure shown in Fig. 1, with the tail gate removed.

Referring to the drawings, the chassis of an automotive dump truck is generally indicated at 10, having rear ground engaging wheels 12 mounted thereon in the usual way. A body, according to the present invention, is generally indicated at 14, and is pivotally mounted with respect to the chassis 10 about transversely aligned pivot points 16 located adjacent the rear end of the chassis.

The body 14 is formed of three main sections, namely, a longitudinally extending central section 18 and oppositely disposed side sections 20 and 22. Such sections are formed of sheet metal and may be welded together as indicated at 24, or may be spot welded along the faces of the abutting flanges.

The central section 18 has depending side portions 26 extending longitudinally thereof which terminate in inwardly turned flanges 28.

Each of the side sections 20 and 22 has upstanding side walls 29 adjacent the outer sides thereof, and has depending portions 30 extending longitudinally of the inner edges thereof, which terminate in outwardly disposed flanges 32. The depending portions 30 are of greater depth than the depending portions 26 so that they depend a substantial distance below flanges 28, for a purpose which will be pointed out in greater detail hereinafter.

The chassis 10 includes longitudinally extending side members 34 of inwardly disposed channel section, thereby providing top and bottom inwardly disposed flanges 36.

A hoist sub-frame, generally indicated at 38, is mounted on the chassis 10 and is fixed thereto. Such sub-frame 38 includes longitudinally extending sill members 40 of Z-cross-section, thereby providing outwardly disposed bottom flanges 42 and inwardly disposed top flanges 44. The flange 38 is substantially coextensive with the rear carrying portion of the chassis 10, and also includes transversely extending bracing members (not shown) so that a rugged and rigid frame unit is provided. A hoisting mechanism is mounted on the sub-frame 38 and is connected to the body so that upon actuation of the hoisting mechanism the body is tilted with respect to the chassis and with respect to the sub-frame 38 about pivots 16. The hoisting mechanism is not shown in the present drawings, and may be of conventional construction. It is preferably of the construction disclosed and claimed in the copending application of Edward R. Barrett, Serial No. 308,303, filed December 8, 1939.

The sub-frame 38 having the hoisting mechanism mounted thereon may then be mounted as a unit on the chassis 10. The flanges 42 seat upon upper flanges 36 and are suitably fixed thereto, such as by bolts 48.

The body 14 is constructed with vertically disposed reinforcing members 50, which are of channel section. The inner edges of the members 50 terminate in outwardly disposed flanges 52, which are adapted to bear against the outside surfaces of sides 29 and be fixed thereto by spot welding. The members 50 are disposed at spaced intervals along the length of the body and depending a substantial distance below the bottoms of side members 20 and 22, as best shown in Figs. 3 and 4.

A plurality of outwardly disposed bottom support members 56, of Z-cross-section thereby forming top flanges 58 and bottom flanges 60, are provided. Such support members 56 are disposed at spaced intervals along the length of the body 14 adjacent the reinforcing members 50. The members 56 are of uniform depth and are of substantially the same depth as the depth of depending portions 30. The inner ends of lower flanges 60 of members 56 are adapted to seat upon flanges 32 and be fixed thereto by spot welding. The upper flanges 58 bear against the undersides of the bottoms of side members 20 and 22, and are spot welded thereto. The outer edges of members 56 terminate substantially flush with the side walls 29 and are fixed to the downwardly extending or depending portions of members 50 by means of longitudinally extending angle members 62. The angle member 62 has its downwardly disposed flange welded to the members 50 adjacent the lower ends thereof, and has its inwardly disposed horizontal flange welded to the bottom flanges 60 of members 66.

Considering the structures so far described, it will be seen that the members 56 contribute toward a rugged body construction through their connections with the depending portions 30, the bottoms of sides 20 and 22, and with members 50. It will also be evident that members 50, 56 and 62 are standard sections, so that substantial lengths of such sections may be kept on hand. Such standard sections may be used in constructing bodies of different widths and bodies of different heights merely by cutting off such sections to the desired lengths. Considerable manufacturing economies are thereby effected, since it is not then necessary to keep on hand a plurality of different sections of different sizes.

The spaces between the members 56 and flanges 39 may be utilized for storage compartments, or may be left vacant if desired. Panel members 64 may be fixed to the members 50 and to the angle members 62, thereby fixing such members with respect to the members 56, by welding if desired. Such panel members 64 are substantially flush with the outside surface of sides 29, so that they form continuations thereof. Other of the panel members, such as indicated at 66, may be hingedly connected to the sides 29 by hinges indicated at 68, forming doors so that the compartment behind is accessible. A bottom plate 70 is fixed to the lower flanges 60 of members 56 in this section, as shown in Figs. 3 and 5, forming the bottom of the compartment. In this section the members 56 are so disposed that the lower flanges 60 face each other. It will thus be seen that storage compartments are provided which are of great utility in trucks of this nature. Only certain of those compartments may be used for storage compartments or any number may be used, as desired.

That section adjacent the rear wheels 12 is provided with a removable panel 72, which is generally similar to panels 64 and 66, but which is preferably constructed with inturned flanges which may be provided with cut-out portions for removable attachment to the angle members 62 or to the members 50. The reason for this is evident, as it will be appreciated that it is necessary to remove the panel 72 when removing or attaching the wheel 12.

With the construction above described, when the body is in its lowered position, it is supported upon flanges 44 of members 40 in that flanges 28 rest thereon. It will thus be seen that portions 30 of the sides 20 and 22 extend below flanges 28, so that the body 14 straddles the subframe 38.

The side portions 30 extend their full length along members 40, so that the depending portions of said sides bear against members 40 from the pivot point to the front of the body. Therefore, it will be evident that as the body is lowered, the depending portions of sides 30 always engage the members 40 in overlapping or straddling relationship, so that the body is self-aligning while it is lowered. The members 56, in their relationship with sides 20 and 22 and members 50, serve to strengthen the body and provide an extremely rugged construction. Elements of relatively light gauge may be used, and it will be appreciated that this is important since the maximum pay-load may be carried. Also, since the elements 50 are relatively shallow and since the panels 64, 68 and 72 form continuations of the sides, the sides of the truck are attractive in appearance and are available for the reception of suitable indicia thereon. This is an important matter in construction of trucks of this type.

Formal changes may be made in the specific embodiment of the invention described without departing from the spirit and substance of the invention, the scope of which is commensurate with the appended claims.

What is claimed is:

1. A vehicle body comprising a central member and oppositely disposed side members secured to said central member, the outer edges of said central member having integral depending portions terminating in inwardly disposed flanges, the inner edges of said side members having integral depending portions terminating in outwardly disposed flanges, the depending portions of said side members extending below the flanges on the depending portions of said central member, said side members having upstanding side walls adjacent the outer edges thereof, outwardly extending bottom support members of Z-section, said support members being of uniform and substantially the same depth as the depending portions of said side members, the top flanges of said support members being secured to the bottoms of said side members and the bottom flanges of said support members being secured to the outwardly disposed flanges of the depending portions of said side members, said support members terminating substantially flush with the sides of said side members, and panel members secured to said support members adjacent the outer edges thereof and forming a depending continuation of the sides of said side members.

2. A vehicle body comprising a central member and oppositely disposed side members secured to said central member, the outer edges of said central member having integral depending portions terminating in inwardly disposed flanges, the inner edges of said side members having integral depending portions terminating in outwardly disposed flanges, the depending portions of said side members extending below the flanges on the depending portions of said central member, said side members having upstanding side walls adjacent the outer edges thereof, outwardly extending bottom support members of Z-section, said support members being of uniform and substantially the same depth as the depending portions of said side members, the top flanges of said support members being secured to the bottoms of said side members and the bottom flanges of said support members being secured to the outwardly disposed flanges of the depending portions of said side members, said support members terminating substantially flush with the sides of said side members, panel members removably secured to said support members and being of substantially the same depth forming a depending continuation of the sides of said side members, and bottom panels secured to certain of said support members between said panel members and said depending portions of said side members, forming storage compartments therein.

3. A vehicle body comprising a central member and oppositely disposed side members secured to said central member, the outer edges of said central member having integral depending portions terminating in inwardly disposed flanges, the inner edges of said side members having integral depending portions terminating in outwardly disposed flanges, the depending portions of said side members extending below the flanges on the depending portions of said central member, said side members having upstanding side walls adjacent the outer edges thereof, outwardly extending bottom support members of Z-section, said support members being of uniform and substantially the same depth as the depending portions of said side members, the top flanges of said support members being secured to the bottoms of said side members and the bottom flanges of said support members being secured to the outwardly disposed flanges of the depending portions of said side members, said support members terminating substantially flush with the sides of said side members, panel members secured to said support members adjacent the outer edges thereof and forming a depending continuation of the sides of said side members, and means removably mounting certain of said panel members to said support members.

4. A vehicle body comprising a central member and oppositely disposed side members secured to said central member, the outer edges of said central member having integral depending portions terminating in inwardly disposed flanges, the inner edges of said side members having integral depending portions terminating in outwardly disposed flanges, the depending portions of said side members extending below the flanges on the depending portions of said central member, said side members having upstanding side walls adjacent the outer edges thereof, depending reinforcing members secured to the outer surfaces of the sides of said side members and extending downwardly therebelow, outwardly extending bottom support members of uniform depth and of substantially the same depth as the depth of the depending portions of said side portions, said support members being secured to said last-named depending portions at the inner edges thereof and being secured to the downwardly extending portions of said reinforcing members adjacent the outer edges of said support members.

5. A vehicle body comprising a central member and oppositely disposed side members secured to said central member, the outer edges of said central member having integral depending portions terminating in inwardly disposed flanges, the inner edges of said side members having integral depending portions terminating in outwardly disposed flanges, the depending portions of said side members extending below the flanges on the depending portions of said central member, said side members having upstanding side walls adjacent the outer edges thereof, depending reinforcing members secured to the outer surfaces of the sides of said side members and extending downwardly therebelow, outwardly extending support members of Z-section having the top flanges thereof secured to the bottoms of said side members and having the bottom flanges thereof secured to the outwardly disposed flanges of the depending portions of said side members adjacent the inner ends of said support members, the outer ends of said support members being secured to the downwardly extending portions of said reinforcing members.

6. A vehicle body comprising a central member and oppositely disposed side members secured to said central member, the outer edges of said central member having integral depending portions terminating in inwardly disposed flanges, the inner edges of said side members having integral depending portions terminating in outwardly disposed flanges, the depending portions of said side members extending below the flanges on the depending portions of said central member, said side members having upstanding side walls adjacent the outer edges thereof, depending reinforcing members secured to the outer surfaces of the sides of said side members and extending downwardly therebelow, outwardly extending support members of Z-section having the top flanges thereof secured to the bottoms of said side members and having the bottom flanges thereof secured to the outwardly disposed flanges of the depending portions of said side members adjacent the inner ends of said support members, the outer ends of said support members being secured to the downwardly extending portions of said reinforcing members, and panel members mounted adjacent the outer ends of said support members substantially flush with the sides of said side members forming a depending continuation of said sides.

7. A vehicle body comprising a central member and oppositely disposed side members secured to said central member, the outer edges of said central member having integral depending portions, the inner edges of said side members having integral depending portions, said depending portions being secured to each other, said side members having upstanding side walls adjacent the outer edges thereof, depending reinforcing members secured to the outer surfaces of the sides of said side members and extending downwardly therebelow, outwardly extending bottom support members of uniform depth and of substantially the same depth as the depth of the depending portions of said side members, said support members being secured to said last named depending portions at the inner edges thereof and being secured to the downwardly extending portions of said reinforcing members adjacent the outer edges of said support members.

8. A vehicle body comprising a central member and oppositely disposed side members secured to said central member, the outer edges of said central member having integral depending portions, the inner edges of said side members having integral depending portions, the depending portions of the side members extending below the depending portions of the central member, said depending portions being secured to each other, said side members having upstanding side walls adjacent the outer edges thereof, depending reinforcing members secured to the outer surfaces of the sides of said side members and extending downwardly therebelow, outwardly extending bottom support members of uniform depth and of substantially the same depth as the depth of the depending portions of said side members, said support members being secured to said last named depending portions at the inner edges thereof and being secured to the downwardly extending portions of said reinforcing members adjacent the outer edges of said support members.

EDWARD R. BARRETT.